Figure 1:
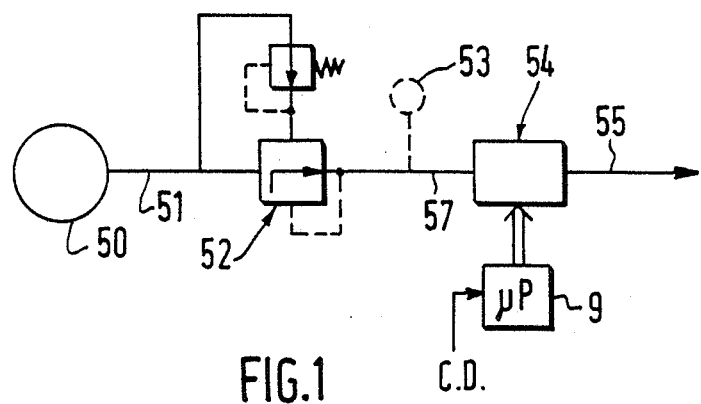

United States Patent [19]

Bourdon et al.

[11] Patent Number: 4,811,755

[45] Date of Patent: Mar. 14, 1989

[54] PROCESS FOR CONTROLLING THE FLOW OF A GAS IN A VALVE AND FLOW GENERATOR EMPLOYING SAID PROCESS

[75] Inventors: Guy Bourdon, Le Chesnay; Dominique Lampin, Chatillon; Daniel Leclerc, Boulogne, all of France

[73] Assignee: L'Air Liquide, Paris, France

[21] Appl. No.: 131,578

[22] Filed: Dec. 11, 1987

[30] Foreign Application Priority Data

Dec. 19, 1986 [FR] France ................ 86 17806

[51] Int. Cl.⁴ .............................................. G05D 7/06
[52] U.S. Cl. .................... 137/486; 137/487.5; 137/624.11
[58] Field of Search ............... 137/487.5, 486, 624.11; 251/129.04

[56] References Cited

U.S. PATENT DOCUMENTS 3,524,344 8/1970 Converse ................... 73/861.64 X
3,834,473 10/1974 Girard et al. .
4,192,348 3/1980 Hansen .

FOREIGN PATENT DOCUMENTS 2185562 4/1974 France .
1155443 6/1969 United Kingdom .

OTHER PUBLICATIONS

Patents Abstracts of Japan, vol. 9, No. 70, (M-367) (1793), March 30, 1985.

Primary Examiner—Alan Cohan
Attorney, Agent, or Firm—Lee C. Robinson, Jr.

[57] ABSTRACT

The valve comprises a movable closure member and a seat in which the closure member is displaced relative to the seat for varying the gas flow through the valve. According to the invention, the process comprises causing the displacement of the movable closure member by means of a step-by-step motor as a function of the variation of the flow produced by each step according to the geometry of the valve, the type of flow employed and the pressure of the gas on the upstream and/or downstream side of the valve, and then producing a corresponding control signal for displacing in the desired direction the motor through the number of steps corresponding to the calculated flow, the displacement of the motor causing the correlative displacement of the movable closure member.

8 Claims, 3 Drawing Sheets

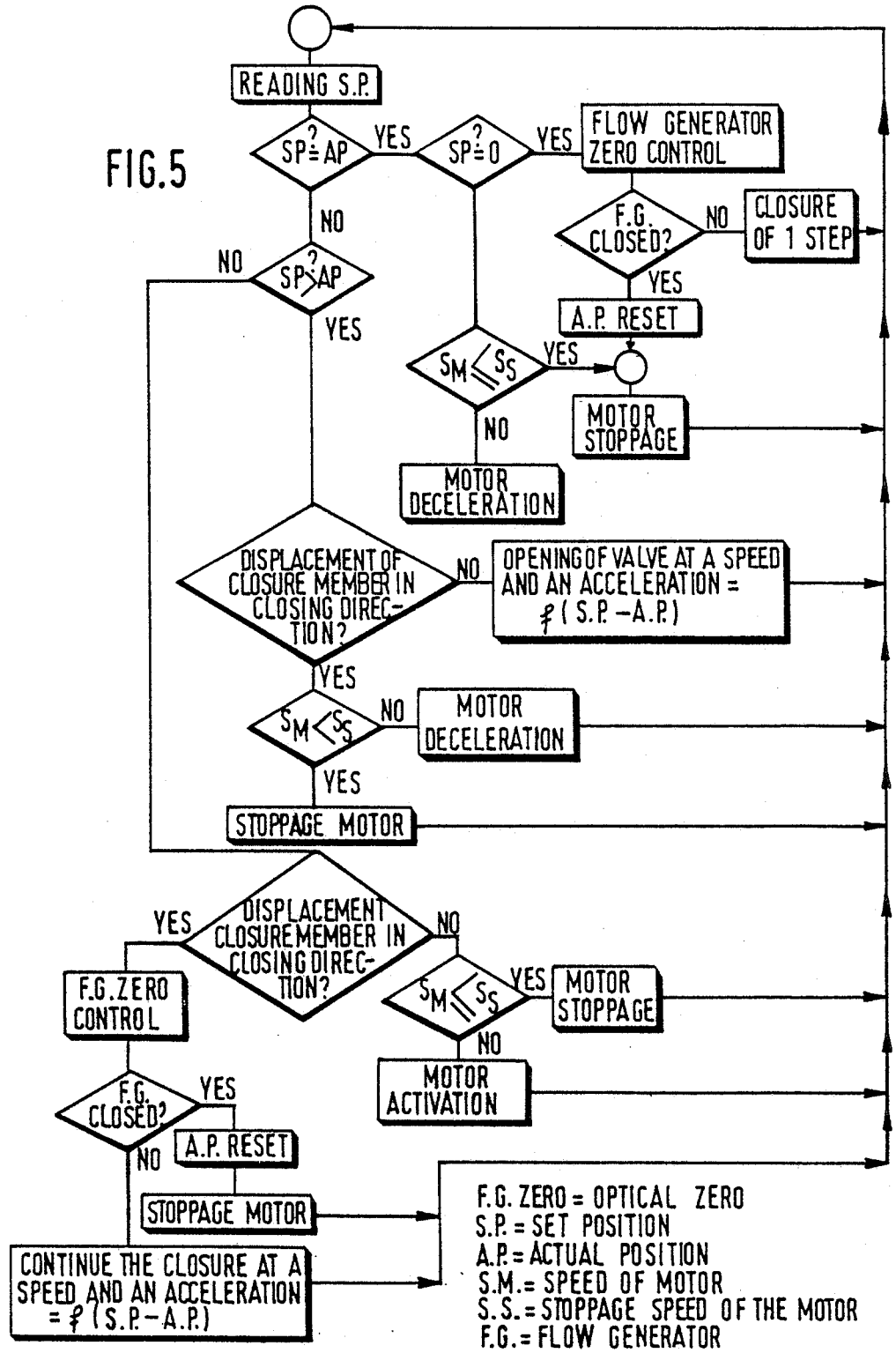

PROCESS FOR CONTROLLING THE FLOW OF A GAS IN A VALVE AND FLOW GENERATOR EMPLOYING SAID PROCESS

The present invention relates to a process for controlling the gas flow in a valve comprising a movable closure member and a seat, in which the closure member is moved relative to the seat for varying the gas flow travelling through the valve.

There is known from European Pat. No. 86,259 a gas flow generator comprising an orifice through which flows the gas from an upstream chamber in which an upstream pressure prevails, into a downstream chamber in which a downstream pressure prevails, said orifice being closed by an electrically-controlled movable closure member. This closure member leaves a passage whose area is determined by its position. The position of the movable closure member is measured in order to obtain a first electric signal representing this position, and the difference between the upstream pressure and the downstream pressure is also measured for delivering a second electric signal representing this pressure difference. These two signals are applied to two respective inputs of an electric calculating circuit which delivers at its output a signal corresponding to the effective rate of flow of the gas. The last-mentioned signal may then be compared with a set or reference signal, and the resulting error signal may be used for controlling the displacement of the movable closure member so that a predetermined rate of flow corresponding to the set value is obtained.

A flow generator comprising two pressure sensors or a differential pressure sensot to which the upstream fluid and the downstream fluid are applied is also disclosed in the articles SIEMENS-ZEITSCHRIFT, volume 41, No. 8, August 1967, pages 692-695, Erlangen, (DE); KURT EWE: "Betriebserprobung eines Segmentblendenschiebers als Messgeber und Stellglied für Durchflusse in extrem grossen Beriechen", REGELUNGSTECHNISCHE PRAXIS, volume 19, No. Apr. 4, 1977, pages M17-M20, R. Oldenbourg Verlag, Munich (DE); G. STROHMANN: "Lösungen von MSR-Aufgab en" and CONTROL ENGINEERING, volume 10, No. 9, September 1963, pages 101-105, New York (USA); G. HARPER: "Gas flow control a fresh viewpoint".

All the fluid flow generators described hereinabove present the drawback of requiring two pressure sensors for repectively measuring the upstream pressure and downstream pressure, so that these generators are relatively complex and expensive.

The present invention avoids resorting to two pressure sensors and, according to a variant, requires no pressure sensor.

The process according to the invention comprises causing the displacement of the movable closure member by means of a step-by-step motor, calculating the number of steps which the motor must effect as a function of the variation of flow produced by each step, according to the geometry of the valve, the type of flow employed and the pressure of the gas on the upstream and/or downstream side of the valve, and then producing a control signal corresponding to the motor for shifting it in the desired direction by the number of steps corresponding to the calculated flow, the displacement of the motor resulting in the correlative displacement of the movable closure member.

According to a preferred embodiment, the process according to the invention comprises, before opening the valve, putting the closure member back in contact with the seat so that the valve is closed, zero setting a counter, calculating the number of steps that the motor must effect as a function of the desired flow of the gases, introducing this number of steps in said counter, and then shifting the motor step-by-step, each step of displacement producing a reduction of one unit of the number of steps introduced in the counter, until this number is equal to zero, the displacments of the motor and the movable closure member then being stopped.

The invention also relates to a gas flow generator comprising a body provided with gas supply means and gas outlet means. A closure member is movable in the body and is controlled by means for displacing the closure member, said movable closure member being disposed in a gas supply pipe connected to the gas supply means and cooperating with a closure member seat placed between the gas supply pipe and a gas outlet pipe connected to the gas outlet means. The displacement of the closure member under the action of the control means permits a variation of the flow of the gases flowing from the gas supply pipe into the gas outlet pipe. The generator further comprises a zero detector for sensing the closed position of the movable closure member relative to its seat. The means for displacing the closure member constituted by a step-by-step motor adapted to be connected to a microprocessor, and the means for driving the closure member cooperates with the shaft of the motor. The zero detector also is connected to said, and the microprocessor is capable of calculating, on the one hand, from the information of the zero position delivered by said sensor and on the other hand from data present in one of its memories relating to the geometry of said pipes, the pressures of the gas on the upstream and downstream sides of the closure member and/or the flow type in which the generator is capable of operating, and the number of steps which the motor must effect and the direction of displacement of the motor to produce a correlative displacement of the closure member.

According to a preferred embodiment, said generator comprises a pressure regulator placed on the upstream side of the valve formed by the closure member and its seat so as to maintain a sonic flow of gas through said valve.

According to a preferred variant, the generator is such that the valve is constituted by a partly split cylindrical needle cooperating with a circular sealing element separating the gas supply pipe from the gas outlet pipe and performing the function of a seat of a closure member. The means for locating the position of the needle is constituted by an optical transmitter-receiver unit placed on each side of the circular sealing element and so oriented that when the bottom of the slot of the needle is on the upstream side of the circular sealing element with respect to the prescribed direction of flow of the gas, thus providing a passage for the gas, the light beam which may be emitted by the transmitter can be captured by the receiver, while, when the bottom of the slot of the needle is on the downstream side of the circular sealing element relative to the prescribed direction of flow for the gas, the light beam which may be emitted by the transmitter cannot be captured by the receiver.

Figure 2:
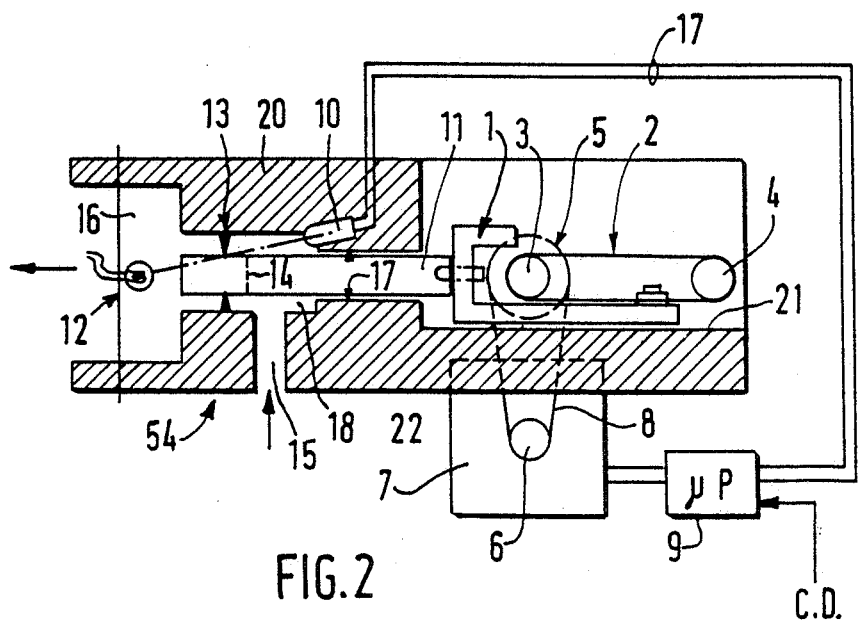
Figure 3:
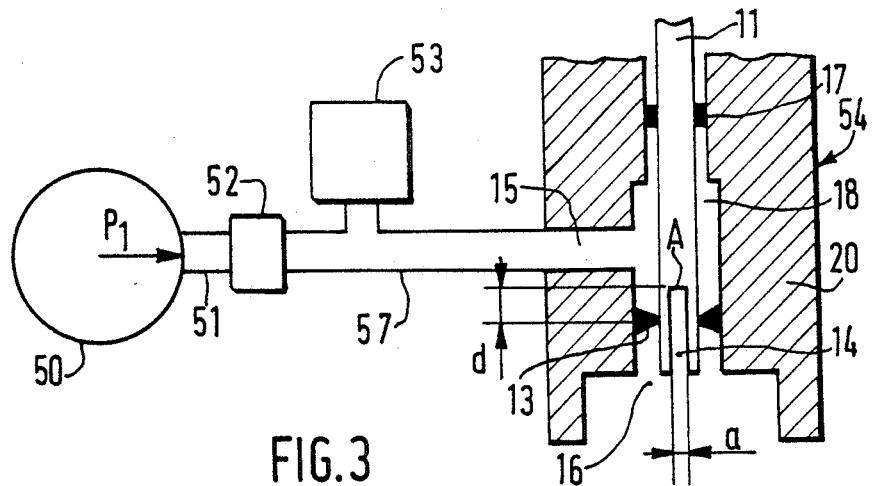
Figure 4:
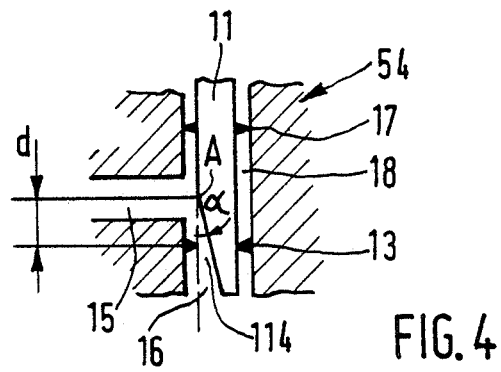

A better understanding of the invention will be had from the following embodiments given by way of a non-limitative example jointly with the figures in which:

FIG. 1 is a diagrammatic representation of an example of the process according to the invention, FIG. 2 is a diagrammatic sectional view of a generator according to the invention, FIG. 3 is a partial diagrammatic sectional view of a device according to the invention, FIG. 4 is a variant of a detail represented in FIG. 3, FIG. 5 is a flow chart showing the mode of operation of the microprocessor controlling the flow generator according to an embodiment of the invention.

FIG. 1 shows the gas supply container 50, the gas being in a liquid or gaseous form in the known manner, connected by a pipe 51 to the piloted pressure reducing valve 52. The value 52 is connected by the pipe 57 to the valve 54 controlled by the microprocessor 9, said valve 54 being connected to the gas outlet pipe 55. A pressure sensor 53, shown in dotted lines in the Figure, may, when this is found to be necessary or when it is desired to know with great precision the pressure of the gas in the pipe 57 before it reaches the valve 54, be connected to said pipe 57. In principle, this is unnecessary, since the piloted pressure reducing valve 52 delivers a gas in the pipe 57 which is of constant pressure irrespective of the pressure on the upstream side of the pressure reducing valve 52 in the pipe 51.

FIG. 2 is a diagrammatic sectional view of the valve 54. The latter comprises a body 20 provided in its centre with a bore 18 in which there is movable in translation a closure member 11 arranged in the form of a movable needle provided with a slot 14. The bore 18, which is of cylindrical shape and has a section larger than the circular section of the needle 11, comprises a first sealing element 17 (on the right side of the Figure) placed on the upstream side relative to the normal direction of flow of the gas supplied through the supply pipe 15 in contact with the bore 18, and a second sealing element 13 placed on the downstream side of the supply pipe 15, this sealing element 13 performing the function of a closure member in cooperation with the movable needle 11, as will be explained hereinafter. The needle 11 is connected by its end remote from that including the slot or slots 14 to a U-shaped member 1, on the horizontal branch of this U, this U-shaped member being movable in translation (horizontal in the Figure) so as to produce a corresponding horizontal translation of the needle 11. The displacement of this member and the needle is produced by a stepped belt 2, the motor 7 driving the toothed wheel 6 in rotation which drives, through the belt 8, the toothed wheel 5 whose rotation drives the belt 2 via pulley 3.

Disposed in the gas outlet pipe 16 of the valve constituted by a bore coaxial with the bore 18 in the body 20 of said valve, is a light source such as a photodiode 12. This photodiode is therefore placed on the downstream side of the closure member 13 relative to the normal direction of flow of the gas through the valve.

Disposed on the upstream side of the closure member 13 is a photo-receiver 10 connected to the body 20 of the valve 54. The photosensitive part of the receiver 10 opens onto the bore 18 so that, when the bottom of the slot 14 is located upstream of the side of the plane defined by the circular sealing element 13 constituting a closure member, the light rays emitted by the photodiode 12 are detected by said photo-detector whereas, when the bottom of the slot 14 is in the plane of the sealing element 13 or on the downstream side of the latter relative to the direction of flow of the gas, the light rays issuing from the photodiode 12 cannot reach the photodetector 10. The arrangement of these photo-emitter and photo-detector elements must be such that, when the photo-detector receives a light signal, the gas can flow in the supply pipe 15 to the outlet pipe 16, while, when the photo-detector 10 receives no light signal, no gaseous current can flow from the pipe 15 to the pipe 16. The photo-detector is electrically connected through connection lines 17 to the microprocessor 9 which controls the operation of the motor in the step-by-step mode in the desired direction and in accordance with the desired number of steps, as will be explained in the description of the embodiment shown in FIG. 5.

FIG. 3 is a partial sectional view of the lower end of the valve 54, in a plane perpendicular to the plane of FIG. 2 containing the axis of the needle 11. In FIG. 3, in which the same elements as in the preceding Figures carry the same reference characters, there are clearly shown the slot 14 of the needle 11, the section of which slot is rectangular, the distance d between the bottom A of this slot 14 and the plane of the sealing element forming the closure member 13 determining, as a function of the width a of the slot 14, the gas flow from the pipe 15 to the pipe 16.

FIG. 4 shows a diagrammatic variation of the embodiment of FIG. 3 in which the split needle of FIG. 3 has been replaced by a beveled needle having a planar surface inclined at an angle alpha relative to the axis of the needle 11. The dstance d between the point A representing the intersection of the beveled face with the cylindrical envelope of the needle 11 and the plane of the sealing element 13, and the value of the angle alpha, permit the determination of the gas flow from the pipe 15 into the pipe 16. The operation of the device described hereinbefore is as follows. In starting with a set flow SF delivered thereto, the microprocessor calculates the number of steps through which the motor must rotate as a function of the geometry of the bore 18, of the slot 14 of the needle and of the type of gas flow employed. Generally, this gaseous flow will be a sonic flow. It is known that in this type of flow, the gas flow Q through a valve is equal to:

$$Q = K \times P_{us} \times S^2,$$

K being a coefficient which is a function of the temperature and of the voluminal mass of the gas considered as a constant for reasons of simplification, $P_{us}$ being the pressure on the upstream side of the valve, and S representing a section of the passage of the gas in the valve. As the piloted pressure reducing valve is adjusted to a given reduced pressure value, this information is sent to the microprocessor either directly at each instant or recorded in a storage memory. With these various data, the microprocessor calculates the number of steps through which the motor must turn. It actuates the motor and counts the number of steps in order to know the position of the movable needle. When the number of steps has been effected, it stops the motor.

The closure of the valve is detected by the unit comprising the photo-emitter 12 and photo-detector 10. When the valve is open, i.e., when the bottom A of the slot 14 is located on the upstream side of the plane of the sealing element 13, the light energy emitted by the photo-detector 12 is received by the photo-detector 10 which delivers a corresponding signal to the microprocessor (for example, logic "1").

When the valve closes, the light no longer passes, the photo-detector 10 is no longer actuated and a corresponding signal is sent via the line 17A to the microprocessor 9 (for example, logic "O").

As will be seen hereinafter, the signal delivered by the photosensitive element is used by the microprocessor which can then verify whether the real zero of the flow coincides with the zero it obtains by counting its steps. If the two zeros do not coincide, the microprocessor resets its counter to zero at the moment when the optical device detects a zero passage.

This operation will be explained in more detail with the aid of FIG. 5 which represents an example of the process according to the invention.

FIG. 5 represents the flow chart of the control of the flow generator.

The principle of operation is the following: when the microprocessor reads a set position of the motor (S.P.), it compares it with the actual position (AP) of the motor.

if S.P.=AP, this means that the motor must stop, or remain inoperative, if S.P.>AP, this means that the motor must be turned in the direction for opening the flow generator, if S.P.<AP, this means that the motor must be turned in the direction for closing the flow generator.

Each time that a request for stopping or reversing the direction of the motor (first of all requiring a stoppage) is observed, the microprocessor compares the speed of the motor (MS) with the stoppage speed (S.P.), at which speed the motor must suddenly stop without losing a step.

if MS<S. P., the motor is stopped,
if MS>S. P., the motor is decelerated.

The acceleration and the speed of the motor are a function of the S.P. deviation to ensure the shortest possible time for reaching the set position while minimizing the stoppage time of the motor.

When the step position is 0 (flow generator closed) or when the motor is in process of closing the flow generator, the microprocessor interrogates the zero detector to know whether the flow generator is in fact closed or not. If the zero detector indicates that the flow generator is closed while AP is not yet 0, this means that there has been a loss of a step. In this case, the microprocessor resets AP to 0.

We claim:

1. A gas flow generator for regulating the flow of gas from a gas supply means, the generator comprising a gas supply pipe for connection to the gas supply means, a body provided with gas outlet means, a gas outlet pipe connected to the gas outlet means, and a closure member movable in the body and being disposed in the gas supply pipe, a seat for cooperation with the closure member to vary the flow of gas through the generator and placed between the gas supply pipe and the gas outlet pipe, closure member control means for displacing the closure member, the displacement of the closure member under the action of said control means permitting a variation of the flow of gas from the gas supply pipe to the gas outlet pipe, said generator comprising a sensor for providing information on the position of the closure member relative to the seat, said closure member control means comprising a. a step-by-step motor having an output shaft, b. a microprocessor which is controllingly connected to the motor and to said sensor and which includes memory means storing i. data relating to the geometry of said valve, ii. data relating to the pressure of the gas on at least one side of the closure member and iii. data relating to the type of gas flow employed, c. means for calculating a number of steps to displace said closure member and thereby vary said flow of gas based on the position information delivered by said sensor and on said data in said memory means, d. means for generating a control signal corresponding to the calculated number of displacement steps so as to displace said closure member in an amount corresponding to said calculated number of displacement steps and e. means for driving the closure member cooperative with the shaft of the motor so as to displace said closure member in a stepwise manner.

2. A generator according to claim 1, comprising a gas pressure regulator placed on an upstream side of the valve formed by the closure member and the seat, so as to maintain a sonic flow of gas through said valve.

3. A generator according to claim 1, wherein the closure member is constituted by a needle defining a slot having an inner end and cooperative with the seat said seat comprising a circular sealing element separating the gas supply pipe from the gas outlet pipe, and the sensor indicating the position of the needle comprising an optical transmitter capable of emitting a light beam and an optical receiver which are placed on opposite sides of the circular sealing element and are so oriented that, when said end of the slot of the needle is on an upstream side of the circular sealing element relative to a prescribed direction of flow of the gas, thus providing a passage for the gas, the light beam can be captured by the receiver, while, when said end of the slot of the needle is on a downstream side of the circular sealing element relative to the prescribed direction of gas flow, the light beam cannot be received by the receiver.

4. A generator according to claim 2, wherein the closure member is constituted by a needle defining a slot having an inner end and cooperative with the seat, said seat comprising a circular sealing element separating the gas supply pipe from the gas outlet pipe, and the sensor indicating the position of the needle and comprising an optical transmitter capable of emitting a light beam and an optical receiver which are placed on opposite sides of the circular sealing element and are so oriented that, when said end of the slot of the needle is on an upstream side of the circular sealing element relative to a prescribed direction of flow of the gas, thus providing a passage for the gas, the light beam can be captured by the receiver, while, when said end of the slot of the needle is on a downstream side of the circular sealing element relative to the prescribed direction of gas flow, the light beam cannot be received by the receiver.

5. A gas flow generator for regulating the flow of gas from a gas supply means, the generator comprising a gas supply pipe for connection to the gas supply means, a body provided with gas outlet means, a gas outlet pipe connected to the gas outlet means, and a closure member movable in the body and being disposed in the gas supply pipe, a seat for cooperation with the closure member to vary the flow of gas through the generator and placed between the gas supply pipe and the gas outlet pipe, closure member control means for displacing the closure member, the displacement of the closure member under the action of said control means permitting a variation of the flow of gas from the the gas supply pipe to the gas outlet pipe, said generator comprising a sensor for providing information of the position of the closure member relative to the seat, said closure member control means comprising
a. a step-by-step motor having an output shaft,
b. a microprocessor which is controllingly connected to the motor and to said sensor and which includes memory means storing data,
c. means for calculating a number of steps to displace said closure member and thereby vary said flow of gas based on the position information delivered by said sensor and on said data in said memory means,
d. means for generating a control signal corresponding to the calculated number of displacement steps so as to displace said closure member in an amount corresponding to said calculated number of displacement steps and
e. means for driving the closure member cooperative with the shaft of the motor so as to displace said closure member in a stepwise manner, said closure member being constituted by a needle including a slot having an inner end and cooperative with the seat, said seat comprising a sealing element separating the gas supply pipe from the gas outlet pipe, and the sensor indicating the position of the needle and comprising an optical transmitter capable of emitting a light beam and an optical receiver, said optical transmitter and optical receiver being placed on opposite sides of the sealing element and being so oriented that, when said inner end of said slot is on an upstream side of the sealing element relative to a prescribed direction of flow of the gas, thus providing a passage for the gas, the light beam can be captured by the receiver, while, when said end of the slot of the needle is on a downstream side of the sealing element relative to the prescribed direction of gas flow, the light beam cannot be received by the receiver.

6. A generator according to claim 5, wherein the sealing element is circular.

7. A generator according to claim 5, wherein said generator further comprises a pressure regulator on an upstream side of the valve formed by the closure member and the seat, so as to maintain a sonic flow of gas through said valve.

8. A generator according to claim 5, wherein said memory means stores
   i. data relating to the geometry of said valve
   ii. data relating to the pressure of the gas on at least one side of the closure member and
   iii. data relating to the type of gas employed.

* * * * *